(12) United States Patent
Fell

(10) Patent No.: US 11,221,218 B2
(45) Date of Patent: Jan. 11, 2022

(54) NOISE PERFORMANCE FOR VIBRATING STRUCTURE GYROSCOPES

(71) Applicant: Atlantic Inertial Systems Limited, Plymouth (GB)

(72) Inventor: Christopher Paul Fell, Bristol (GB)

(73) Assignee: ATLANTIC INERTIAL SYSTEMS LIMITED, Plymouth (GB)

(*) Notice: Subject to any disclaimer, the term of this patent is extended or adjusted under 35 U.S.C. 154(b) by 102 days.

(21) Appl. No.: 16/713,378

(22) Filed: Dec. 13, 2019

(65) Prior Publication Data
US 2021/0048296 A1 Feb. 18, 2021

(30) Foreign Application Priority Data

Aug. 12, 2019 (GB) .................................... 1911534

(51) Int. Cl.
*G01C 19/5684* (2012.01)
*G01C 19/5719* (2012.01)

(52) U.S. Cl.
CPC ..... *G01C 19/5684* (2013.01); *G01C 19/5719* (2013.01)

(58) Field of Classification Search
CPC .......................... G01C 19/5684; G01C 19/5719
See application file for complete search history.

(56) References Cited

U.S. PATENT DOCUMENTS

| 5,932,804 A | 8/1999 | Hopkin et al. |
| 6,401,534 B1 | 6/2002 | Fell et al. |
| 7,958,781 B2 | 6/2011 | Fell |
| 8,011,245 B2 | 9/2011 | Yatzenko et al. |
| 8,205,495 B2 | 6/2012 | Challoner |
| 8,555,717 B2 | 10/2013 | Fell et al. |

(Continued)

FOREIGN PATENT DOCUMENTS

| EP | 3470784 A1 | 4/2019 |
| GB | 2567479 A | 4/2019 |

(Continued)

OTHER PUBLICATIONS

European Search Report for Application No. 19215705.5, dated Jul. 9, 2020, 10 pages.

(Continued)

*Primary Examiner* — Xin Y Zhong
(74) *Attorney, Agent, or Firm* — Cantor Colburn LLP

(57) ABSTRACT

A vibrating structure angular rate sensor comprises a MEMS structure includes a mount, a plurality of supporting structures fixed to the mount, and a vibrating planar ring structure flexibly supported by the plurality of supporting structures to move elastically relative to the mount. At least one primary drive transducer is arranged to cause the ring structure to oscillate in a primary mode at the resonant frequency of the primary mode. At least one primary pick-off transducer arranged to detect oscillation of the ring structure in the primary mode. At least three secondary pick-off transducers are arranged to detect oscillation of the ring structure in a secondary mode induced by Coriolis force when an angular rate is applied around an axis substantially perpendicular to the ring structure. At least one secondary drive transducer is arranged to null the induced oscillation in the secondary mode.

14 Claims, 9 Drawing Sheets

(56) References Cited

U.S. PATENT DOCUMENTS

2011/0167911 A1    7/2011  Fell et al.
2012/0125100 A1*   5/2012  Araki ................. G01C 19/5684
                                                              73/504.12

FOREIGN PATENT DOCUMENTS

JP         2011027561 A      2/2011
JP         2011027562 A      2/2011

OTHER PUBLICATIONS

Search Report from IPO for Application No. GB1911534.4, dated Feb. 13, 2020, 5 pages.

* cited by examiner

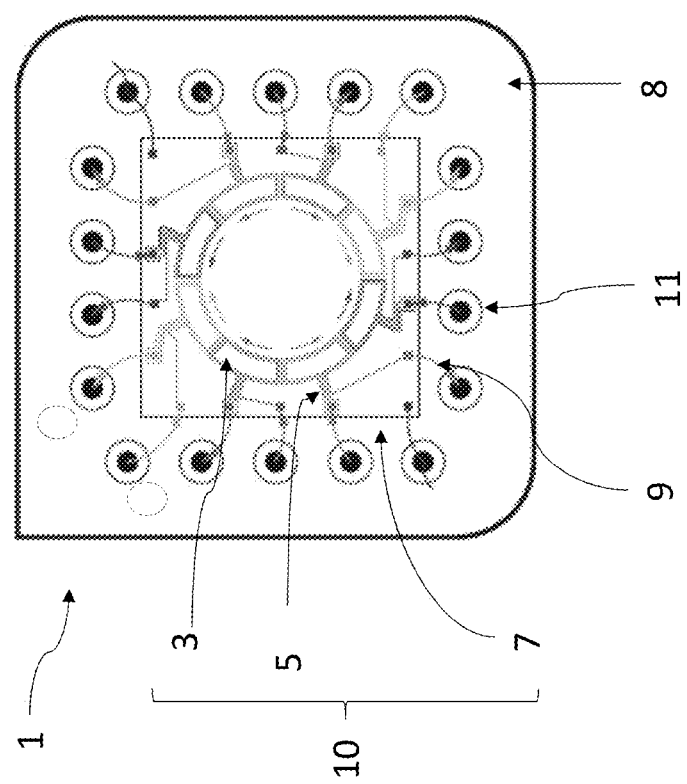

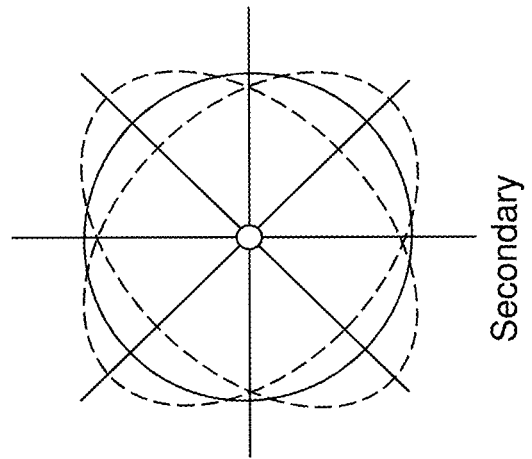
Fig. 2a Primary
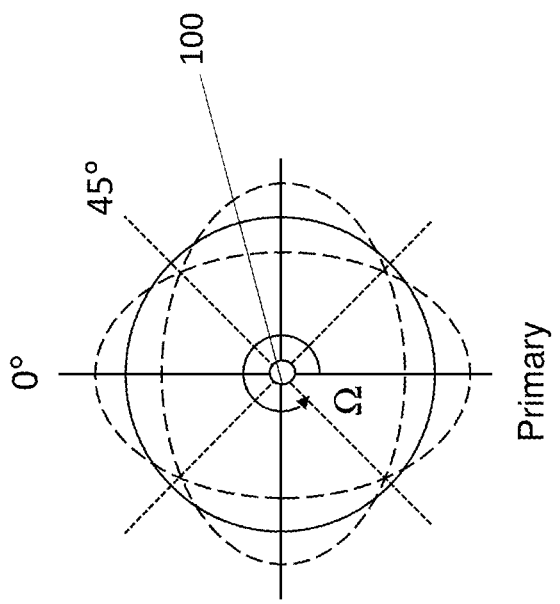
Fig. 2b Secondary
PRIOR ART

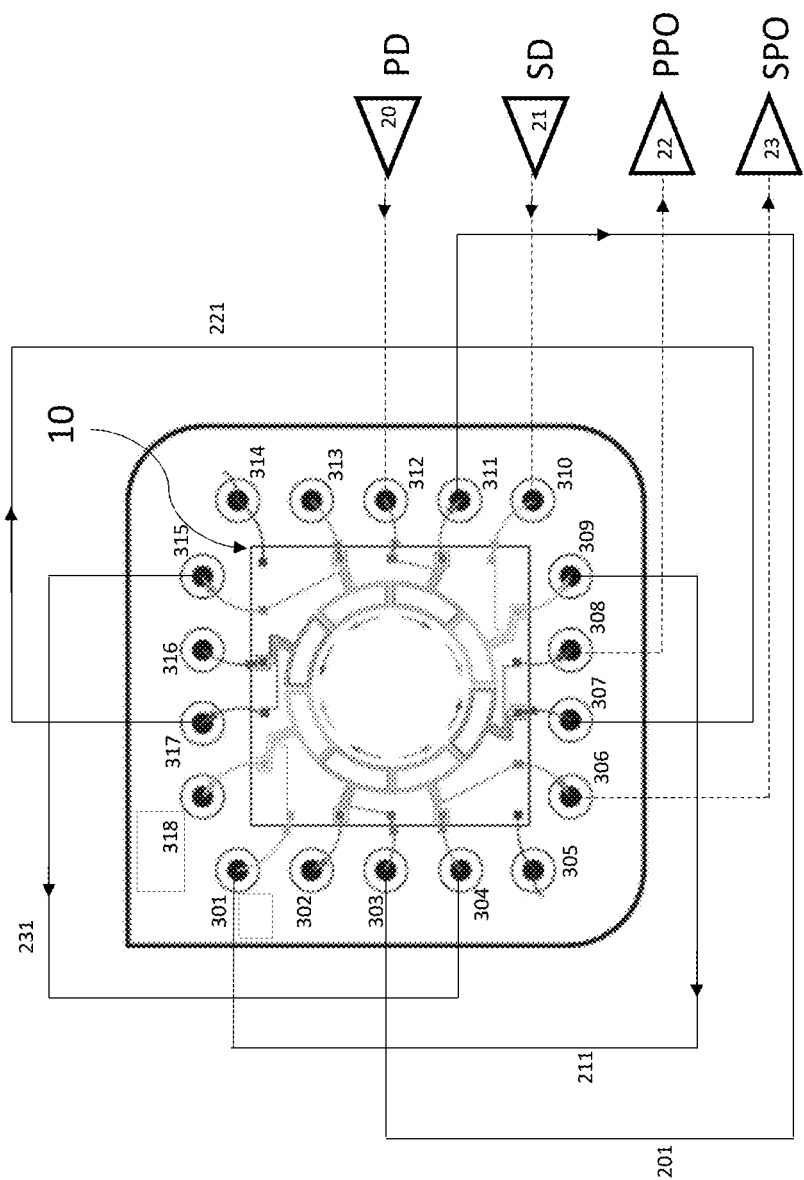

NOISE PERFORMANCE FOR VIBRATING STRUCTURE GYROSCOPES

FOREIGN PRIORITY

This application claims priority to Great Britain Patent Application No. 1911534.4 filed Aug. 12, 2019, the entire contents of which is incorporated herein by reference.

TECHNICAL FIELD

This disclosure generally relates to vibrating structure gyroscopes and angular rate sensors and, more specifically, Coriolis type angular rate sensors comprising a vibrating structure such as a planar ring, and to methods of improving the noise performance of such angular rate sensors.

BACKGROUND

In many applications, vibrating structure angular rate sensors (also known as gyroscopes) are constructed using Micro-Electro-Mechanical Systems (MEMS) techniques, in which a device is fabricated from a silicon wafer, which may be bonded to a glass substrate wafer or alternatively sandwiched between two glass substrate layers.

Typically, many of the higher performance MEMS gyroscopes use structures comprising planar rings, supported by a number of flexible, or compliant, supporting structures (also known as "legs") which are in turn attached to a mount, which may consist of a rigid silicon frame or central hub. The frame or hub is in turn rigidly fixed to a glass substrate. Due to the compliant nature of the supporting structures, the planar ring may move elastically relative to the silicon mount, for example when deformed by an applied force.

It is well known in the prior art that the planar ring structure can be made to vibrate in a resonant mode using actuators located around the ring perimeter. In practice, pairs of actuators can excite the planar ring into a primary mode of resonance, in which a constant amplitude of motion is maintained at all times. When a rotation is applied around an axis perpendicular to the plane of the ring, Coriolis forces couple energy into a secondary mode of vibration, with the amplitude of the vibration being proportional to the applied angular rate. Coriolis-induced vibration can therefore be measured and used to calculate the rate of angular motion experienced by the angular rate sensor.

These angular rate sensors may be actuated using capacitive, piezoelectric or electromagnetic transducers, which are typically arranged in diametrically opposed pairs of transducers for both the driving and detection of vibrational modes. The primary mode of resonance (the Cos $2\theta$ mode) is routinely achieved using a common Primary Drive (PD) signal applied to a pair of drive transducers aligned at, for example, 0° and 180°. Similarly, the signals derived from two diametrically opposed Primary Pick-off (PPO) sensing transducers, located at, e.g. 90° and 270°, can be used to measure the vibration amplitude.

The Coriolis-induced secondary vibration mode motion, excited when the ring is rotated, is typically detected by means of a pair of Secondary Pick-off (SPO) sensing transducers aligned at, for example, 135° and 315°. This secondary vibration motion may be measured directly or, more typically, the induced motion is nulled by means of Secondary Drive (SD) transducers aligned, for example, at 45° and 225°. In this "force-feedback" mode of operation, the applied nulling force is directly proportional to the applied angular rate, allowing the rate of angular motion experienced by the angular rate sensor to be determined.

Diametrically opposed drive transducer pairs are used in the prior art so that the forces applied by the transducer pairs to excite the cos $2\theta$ mode do not apply any net linear force which could induce a rigid body motion of the ring. Additionally, the use of opposed sensing transducer pairs can prevent perturbing signals, resulting from in-plane motion caused by applied shock or vibration, from being detected. Perturbing signals such as those caused by shock will be out-of-phase as determined by the opposed pairs of sensing transducers, and therefore cancel when the signals are summed together.

An important consideration for vibrating structure gyroscopes and angular rate sensors is the noise performance, which is known to be dominated by the noise of the sensing amplifier receiving signals from the SPO sensing transducers. There remains a need to improve noise performance.

SUMMARY

According to a first aspect of this disclosure, there is provided a vibrating structure angular rate sensor comprising: a MEMS structure comprising a mount, a plurality of supporting structures fixed to the mount, and a vibrating planar ring structure flexibly supported by the plurality of supporting structures to move elastically relative to the mount; at least one primary drive transducer arranged to cause the ring structure to oscillate in a primary mode at the resonant frequency of the primary mode; at least one primary pick-off transducer arranged to detect oscillation of the ring structure in the primary mode; at least three secondary pick-off transducers arranged to detect oscillation of the ring structure in a secondary mode induced by Coriolis force when an angular rate is applied around an axis substantially perpendicular to the ring structure; and at least one secondary drive transducer arranged to null the induced oscillation in the secondary mode. The number of secondary pick-off transducers and the number of secondary drive transducers is an odd number, and wherein the number of secondary drive transducers is smaller than the number of secondary pick-off transducers.

In such a vibrating structure angular rate sensor, there may be just one secondary drive transducer rather than a pair of drive transducers, as is conventional. Without changing the physical layout of the transducers, there can then be made available an extra secondary pick-off transducer, e.g. so that there are at least three secondary pick-off transducers. The sensing signal from the additional secondary pick-off transducer can be added directly to the existing sensing signals, thereby improving the signal-to-noise ratio without using a second sensing amplifier (which would add unwanted noise).

In accordance with this disclosure, there is an odd number of secondary drive and pick-off transducers. The additional secondary pick-off transducer does not have a corresponding diametrically opposed transducer, as is conventional, so any perturbing signals (such as those caused by shock) will generate a signal which is not cancelled, as for diametrically opposed pairs. However, the Applicant has realised that these perturbing signals will not be at the resonant frequency of the ring so can be rejected by signal processing electronics, provided the amplitude is below the saturation threshold of the sensing amplifiers. The Applicant has further realised that saturation will not typically occur when measurements are made in static or non-dynamic environments with low levels of shock and vibration. In those environments where perturbing signals are unlikely, and/or in which measurements are taken over relatively long time periods (e.g. 10 seconds or more), there is less need for diametrically opposed drive transducer pairs. The Applicant has recognised that, in such scenarios, re-purposing one of a pair of secondary drive transducers as a sensing transducer can result in an improved signal to noise ratio when compared to the case of diametrically opposed drive transducer pairs.

Such sensors may find particular use in applications such as North Finding, where measurements of the Earth's rotation rate are made with the sensor stationary so the required angular rate range is very low.

In order to benefit from having a larger number of secondary pick-off transducers, the sensing signals from the secondary pick-off transducers may be summed together. Thus, in at least some examples, the at least three secondary pick-off transducers are electrically connected in series.

The sensing signals from the secondary pick-off transducers may be combined at any stage. However, it is preferable to retain conventional pin connections and arrange for each of the at least three secondary pick-off transducers to be connected to a common output. Thus, in at least some examples, the sensor may further comprise a secondary pick-off signal output arranged to receive a secondary pick-off signal from each of the at least three secondary pick-off transducers.

The secondary pick-off signal output may amplify its sensing signal, as is conventional, using analogue or digital techniques. However, the Applicant has realised that the increased amplitude of the sensing signal is most useful for improving signal-to-noise ratio when analogue amplification is applied. Thus, in at least some examples, the secondary pick-off signal output comprises an analogue amplifier. The secondary pick-off signal is first amplified by the analogue amplifier even if the signal is then applied to a digital control loop.

It is well known that a sensing signal from the secondary pick-off signal output can be used for angular rate detection in a closed loop implementation, that is, where the at least one secondary drive transducer is arranged to null the induced oscillation in the secondary mode. This is described, for example, in U.S. Pat. No. 8,555,717, the contents of which are hereby incorporated by reference. In at least some examples, the sensor further comprises a rate control loop connected to the secondary pick-off signal output. In at least some examples, in addition or alternatively, the sensor further comprises a rate output circuit connected to the secondary pick-off signal output and arranged to provide an output representative of the applied angular rate. The rate output circuit may be connected to the secondary pick-off signal output via the rate control loop.

In closed loop operation, a secondary drive signal is applied to the at least one secondary drive transducer with a magnitude set to null the induced oscillation in the secondary mode. According to the present disclosure, the number of secondary drive transducers is reduced and a single secondary drive transducer may be used instead of a pair of secondary drive transducers, as is conventional. It may be desirable to maintain the same level of oscillation in the primary mode, regardless of the number of secondary drive transducers, and hence the scale factor (i.e. the drive required to null a given applied angular rate, which is typically 1 degree per second) will be doubled when using a single secondary drive rather than a pair of secondary drive transducers. In some instances it may be desirable to adjust the scale factor to be identical to the value for the sensor using two secondary drive transducers. This may be achieved by adjusting (halving) the gain of the rate output circuit. More generally, the secondary drive signal may be multiplied by a coefficient that depends on the number of secondary drive transducers. Thus, in at least some examples, the rate control loop is arranged to apply a secondary drive signal to the at least one secondary drive transducer, the secondary drive signal having a magnitude including a coefficient dependent on the number of secondary drive transducers. For example, the coefficient is two when there are three secondary pick-off transducers. Thus it will be understood that the coefficient is a multiplier selected depending on the number of secondary drive transducers. This rate control loop may otherwise be implemented in the same way as for example that described in U.S. Pat. No. 8,555,717, already incorporated by reference above.

It should be appreciated that the sensor may include any suitable number of primary drive transducers and primary pick-off transducers. It is conventional to have an even number of primary drive transducers and an even number of primary pick-off transducers, and usually the same number of primary drive transducers and primary pick-off transducers. Symmetrical pairs are conventional at least for the reasons already discussed above. Most usually, in a sensor as disclosed herein, the primary transducers may consist of a pair of primary drive transducers and a pair of primary pick-off transducers. In at least some examples of the present disclosure, the sensor retains a conventional eight-fold arrangement of transducers. Such an arrangement is preferable as eight is the minimum number of transducers required to enable each of the four transducer functions (i.e. primary drive, primary pick-off, secondary drive and secondary pick-off) to operate with a ring utilising cos 2θ vibration modes, to be implemented conventionally using diametrically opposed transducer pairs. Thus, in at least some examples, the transducers consist of a pair of primary drive transducers, a pair of primary pick-off transducers, one secondary drive transducer and three secondary pick-off transducers.

In various examples of the present disclosure, the transducers are spaced equiangularly around a circumference of the vibrating planar ring structure. Such an arrangement is well known in the art, for example as described in U.S. Pat. No. 8,555,717, already incorporated by reference above.

A sensor according to the present disclosure is suitable for an electromagnetic drive and sensing scheme. In at least some examples, each transducer is an inductive-type transducer. Such an arrangement is well known in the art, for example as described in U.S. Pat. No. 8,555,717, already incorporated by reference above.

A sensor according to the present disclosure is suitable for an electrostatic drive and sensing scheme. In at least some examples, each transducer is a capacitive-type transducer. Such an arrangement is well known in the art, for example as described in U.S. Pat. No. 7,958,781, the contents of which are hereby incorporated by reference.

The MEMS structure is conveniently fabricated using wafer etching techniques. In at least some examples, the MEMS structure is a semiconductor structure, for example a silicon structure. For example, the mount, supporting structures and ring structure may all be etched from the same silicon wafer as a monolithic structure. The MEMS structure may optionally be fixed to a substrate, or sandwiched between substrates. Such substrate(s) may be formed of glass or silicon.

It will be appreciated that the various circuits or control loops disclosed herein are not usually formed in the MEMS structure but may be electrically connected to the MEMS structure by appropriate means, such as e.g. downhole vias and wire bonds. In at least some examples, the sensor may further comprise a sensor package, the MEMS structure being sealed inside the sensor package, and a printed circuit board on which the sensor package is mounted, wherein electrical connections are made from the printed circuit board to the MEMS structure through the sensor package.

BRIEF DESCRIPTION OF THE DRAWINGS

Certain exemplary embodiments of this disclosure will now be described, with reference to the accompanying drawings, in which:

FIG. 1 illustrates a typical vibrating structure angular rate sensor as found in the prior art;

FIGS. 2a and 2b show diagrammatically the primary Cos 2θ and secondary Sin 2θ vibration modes, respectively, of a vibrating planar ring structure in a vibrating structure angular rate sensor;

FIG. 3 illustrates a standard layout of the connections between a vibrating planar ring structure and its associated control electronics as known in the prior art;

DETAILED DESCRIPTION

Figure 4:
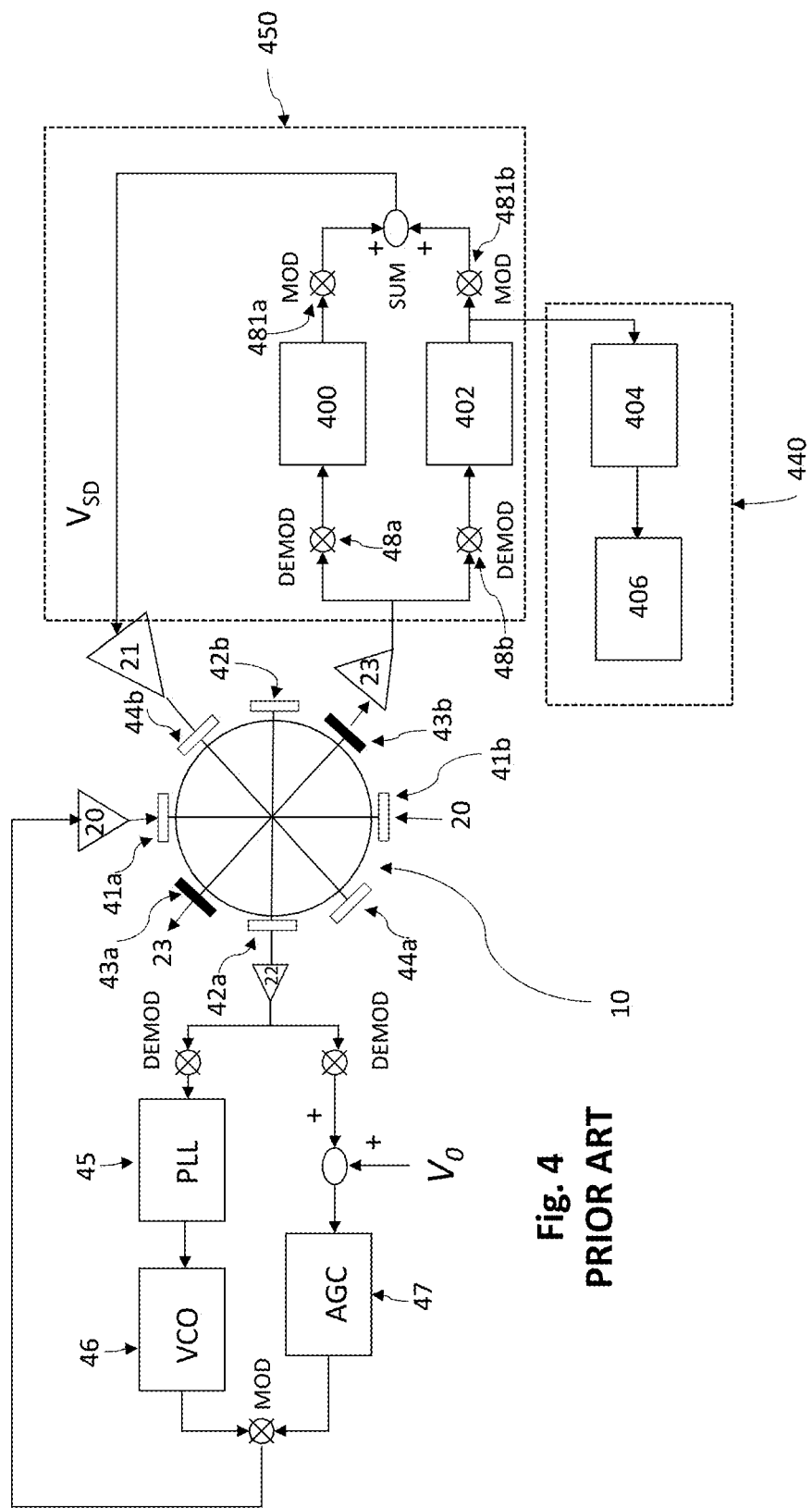
FIG. 4 schematically illustrates the control electronics of a vibrating structure angular rate sensor as known in the prior art.

FIG. 1 shows a schematic plan view of a MEMS angular rate sensing device 1 as known from the prior art, for example as described in U.S. Pat. No. 8,555,717, and known to be used in exemplary gyro products (e.g. Silicon Sensing Ltd. CRS39 and CRH02 gyros).

The angular rate sensing device 1 comprises a MEMS structure 10 which consists of an annular resonator in the form of a planar ring 3 supported by eight pairs of equiangularly spaced compliant supporting structures 5, which extend from the planar ring 3 to a rigid mount 7. The planar ring 3, supporting structures 5 and rigid mount 7 are typically formed from a semiconductor material, e.g. silicon. The supporting structures 5 are flexible or compliant compared to the rigid mount 7 and planar ring 3, allowing the planar ring 3 to move elastically relative to the rigid mount 7, for example when deformed by an applied force.

Typically the MEMS structure 10 is mounted on the base 8 of a sealed metal can package with electrical connections made from either end of each tracking loop on the rigid mount 7, via wire bonds 9, to isolated pin connections 11 in the package base 8, as shown in FIG. 1. The package is mounted on a printed circuit board (PCB) via the contact pins 11 in the base 8 which connect to electrical circuitry (not shown in FIG. 1).

Eight conductive tracking loops, shown diagrammatically as arrows on the supporting structures 5, are configured on the surface of the MEMS structure 10. Each of the tracking loops passes from the mount 7, along the first leg of the pair, around an eighth segment of the ring 3 and then back to the mount 7 via the adjacent leg of the pair. In this example the sensing device 1 is actuated electromagnetically. A magnetic field is provided around the ring circumference, perpendicular to the tracking and ring 3, to enable Cos 2θ vibration modes, shown in FIG. 2a, to be excited and detected electromagnetically. Such an inductive-type sensor is described in detail in U.S. Pat. No. 8,555,717, already incorporated by reference above. When a rotation at an angular rate Ω is applied around an axis 100 perpendicular to the plane of the ring (i.e. out of the page in FIG. 2a), Coriolis forces couple energy into a secondary mode of vibration, shown in FIG. 2b, with the amplitude of the vibration being proportional to the applied angular rate.

The electrical connections on the PCB between the pins 301-318 of the angular rate sensing device 1 as known from the prior art is shown in FIG. 3. The primary drive (PD) current is applied via circuitry on the PCB at PD input 20 (shown in more detail in FIG. 4) to pin 312. The PD current flows around a first tracking loop on the MEMS structure 10 to pin 311. Thus pins 311, 312 correspond to a first primary drive transducer. Pin 311 is connected via tracking 201 on the PCB to pin 303 and the PD current then flows around a second tracking loop to pin 302. Pins 302, 303 correspond to a second primary drive transducer that is diametrically opposed to the first, forming a symmetrical pair of primary drive transducers. Similarly, a first primary sensing or pick off (PPO) tracking loop connects from pin 316 around an eighth segment of the ring to pin 317 which is electrically connected via tracking 221 on the PCB to pin 307. A second tracking loop runs from pin 307, via a second MEMS ring segment, to pin 308 which is then connected to a PPO output 22 on the PCB. The pins 316, 317 and 307, 308 correspond to a symmetrical pair of diametrically opposed primary pick-off transducers.

The two secondary drive (SD) loop segments, the first of which is connected to pins 310 and 309 and the second to pins 301 and 318, are similarly connected in series by tracking 211 on the PCB between pins 309 and 301 with the SD current applied via pin 310 from SD input 21. The pins 309, 310 and 301, 318 correspond to a symmetrical pair of diametrically opposed secondary drive transducers. A secondary sensing or pick off (SPO) loop between pins 313 and 315 is connected by tracking 231 on the PCB to a second loop between pins 304 and 306. Pin 306 connects to SPO output 23 on the PCB. The pins 313, 315 and 304, 306 correspond to a symmetrical pair of diametrically opposed secondary pick-off transducers. Pins 305 and 314 connect the MEMS structure 10 to the PCB ground.

FIG. 4 shows a schematic diagram of a conventional control electronics implementation for an angular rate sensing device 1 according to the prior art. A primary drive (PD) signal derived from the primary control loops, configured as shown in FIG. 3, is applied via PD input 20, to the diametrically opposed PD transducers 41a, 41b, at 0° and 180°. The resultant ring motion is detected using the PPO transducer pair 42a, 42b, at 90° and 270°. The PPO signal is applied to an output 22, e.g. comprising a front end amplifier, and is then demodulated and applied to a Phase Locked Loop (PLL) 45, which measures the phase difference between the PD signal applied at the PD input 20 and the PPO signal from the PPO output 22. The PLL output is then used to adjust a Voltage Control Oscillator (VCO) 46, which adjusts the primary drive signal frequency to maintain a 90° phase shift between the applied drive force and the induced resonant motion. The demodulated PPO signal is also applied to an Automatic Gain Control (AGC) loop 47 which compares the signal level to a fixed reference voltage $V_0$, and adjusts the PD signal amplitude to maintain a fixed signal level at the PPO amplifier 22 and hence a fixed vibration amplitude.

The signal from the SPO transducers 43a, 43b, is applied to an output 23 and then demodulated at demodulators 48a, 48b to separate the real and quadrature signal components. The real component is that which is in phase with the primary mode motion and is generated due to the Coriolis forces arising due to applied rotation. The quadrature component arises due to errors in the frequency matching between the two vibration modes and must be separated from the rate-induced signal.

After being demodulated at demodulators 48a, 48b, the SPO real and quadrature signals are filtered (blocks 400, 402) to achieve the required system performance in terms of noise and bandwidth. In a rate output circuit 440, the real component is filtered (block 404) and output (block 406) to provide an output representative of the applied angular rate. In a rate control loop 450, the filtered real and quadrature signal components from blocks 400,402 are then re-modulated at modulators 481a, 481b, summed, and a secondary drive signal $V_{SD}$ is applied to SD input 21 to drive the secondary drive transducers 44a, 44b, to null the secondary mode motion of the angular rate sensing device 1.

The prior art implementation shown in FIGS. 3 and 4 employs diametrically opposed transducer pairs for the primary drive transducers 41a, 41b, secondary drive transducers 44a, 44b, primary sensing or pick-off transducers 42a, 42b and secondary sensing or pick-off transducers 43a, 43b. However, in applications where high angular rate inputs are unlikely (e.g. North finding), the Applicant has recognised that a single secondary drive transducer 44a, 44b is sufficient to null the secondary mode, allowing the unused secondary drive transducer to be re-purposed as a sensing transducer.

Figure 6:
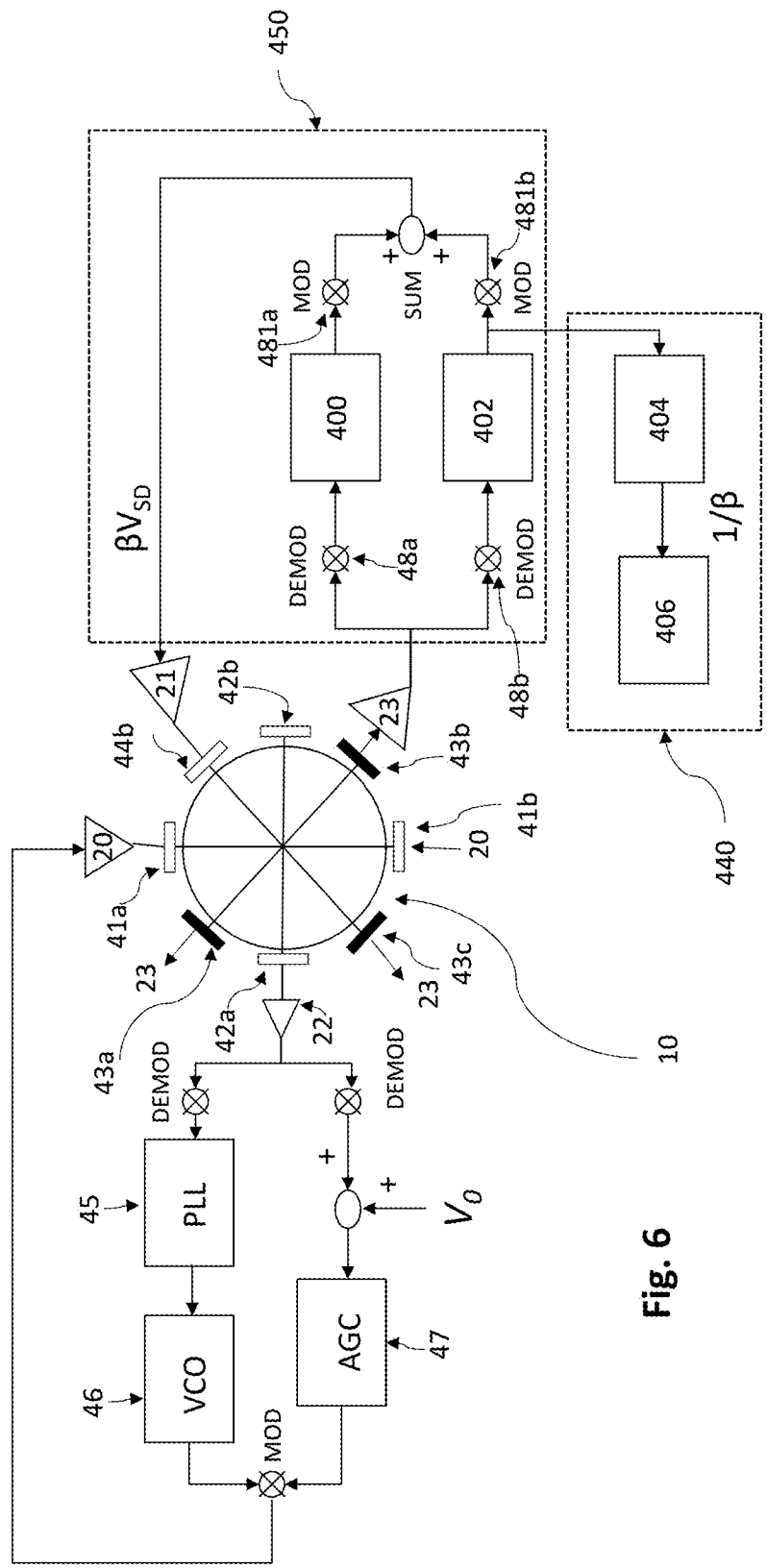
FIG. 6 schematically illustrates the control electronics of a vibrating structure angular rate sensor according to an example of the present disclosure.

As can be seen in FIG. 4, the secondary drive transducers 44a, 44b are located at 90° with respect to the standard secondary sensing transducer pair 43a, 43b. As a result, if one of the secondary drive transducers 44a, 44b were to be repurposed as an additional secondary sensing transducer 43c, as seen in FIG. 6, any signal detected would be in anti-phase compared to that of the pair of secondary drive transducers due to the cos 2θ motion.

Modifications may be made to the standard configuration of the angular rate sensors known in the prior art, such as that shown in FIGS. 3 and 4, to enable an additional sensing transducer signal to be added directly to a secondary sensing channel, thus enabling the signal to noise ratio to be improved by a factor of 3/2. These modifications may be made to the PCB connections and control electronics, as shown in FIGS. 5 and 6 respectively.

Figure 5:
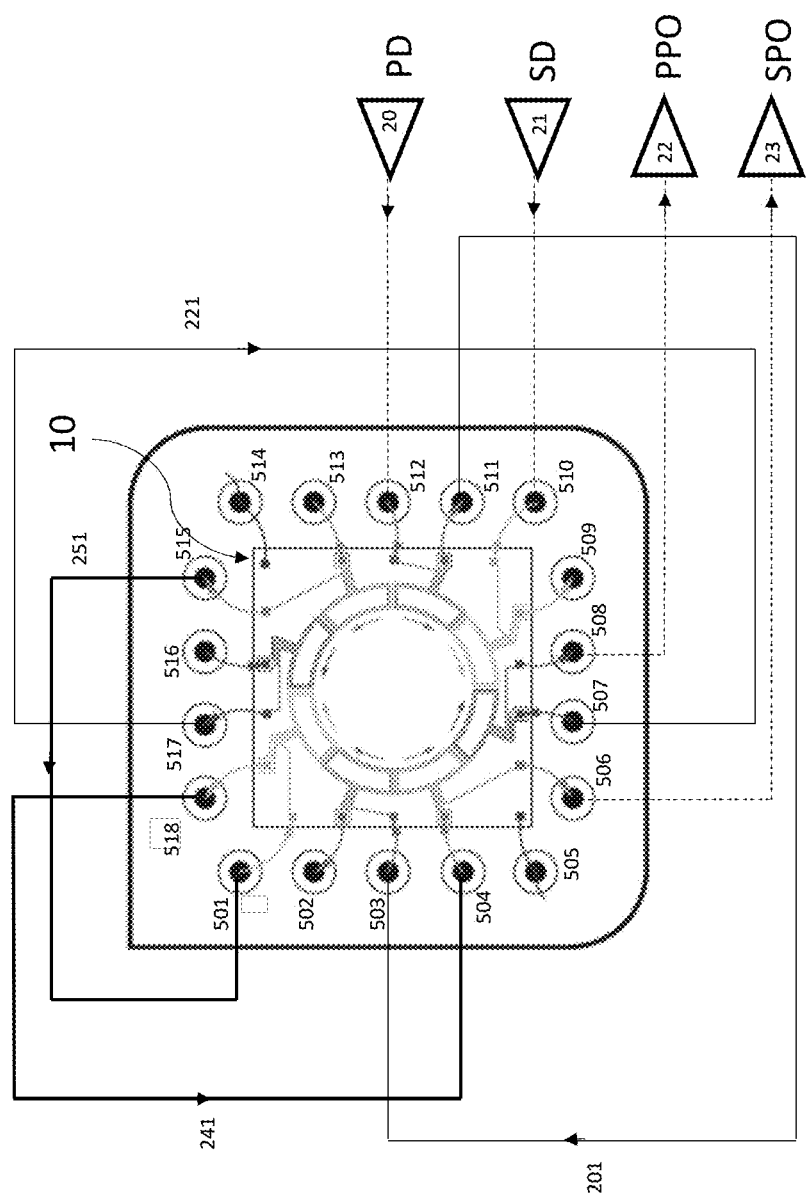
FIG. 5 illustrates a layout of the connections between a vibrating planar ring structure and its associated control electronics according to an example of the present disclosure.

FIG. 5 shows a modified set of electrical connections for the angular rate sensing device 1 according to an example of the present disclosure. The MEMS structure 10 is equivalent to that described in the prior art and shown in FIG. 1, however the electrical connections between the MEMS structure 10 and the control circuitry are modified by changing the appropriate connections between the pins 501-518.

In FIG. 5, the primary drive (PD) current is applied via circuitry on the PCB at PD input 20 (shown in more detail in FIG. 4) to pin 512. The current flows around a first tracking loop on the MEMS structure 10 to pin 511. Pin 511 is connected via tracking 201 on the PCB to pin 503 and the current then flows around a second tracking loop to pin 502. Similarly, a first primary sensing (PPO) tracking loop connects from pin 516 around an eighth segment of the ring to pin 517 which is electrically connected via tracking 221 on the PCB to pin 507. A second tracking loop runs from pin 507, via a second ring segment, to pin 508 which is then connected to a PPO output 22. The primary drive and primary pickoff connections are identical to those described in the prior art and shown in FIG. 3.

The secondary drive (SD) loop segments are modified compared to the prior art. The secondary drive input 21 is connected to pin 510 and flows around a single tracking loop segment to pin 509. Unlike in the prior art, the secondary drive current is only applied via a single tracking loop segment, i.e. a single secondary drive transducer corresponding to the pins 509, 510. There is no further connection via tracking loop 211 to pins 501 and 518. Instead, pins 501 and 518 are included in the secondary sensing loop segment and therefore correspond to an additional secondary pick-off transducer.

The secondary sensing or pick-off (SPO) loop is connected from the SPO output 23 on the PCB to a loop between pins 506 and 504. Pin 504 is now connected by tracking 241 to the additional loop between pins 518 and 501, and the additional loop is further connected via tracking 251 to the loop segment between pins 515 and 513. In this way, three tracking loop segments are included in the secondary sensing loop.

The additional secondary pick-off transducer added to the secondary sensing loop provides an extra secondary pick-off transducer signal to the secondary sensor channel, and can enable the signal to noise ratio to be improved by a factor of 3/2. This improvement in signal to noise ratio can be achieved without making any changes to the MEMS structure 10 or can package and requires only simple connection modifications to the PCB, such as those as described in relation to FIG. 5. These modifications may therefore be implemented very easily and at low cost.

FIG. 6 shows a schematic diagram of a control electronics implementation for an angular rate sensing device 1 according to an example of the present disclosure. The control electronics may be implemented almost identically to those described for the prior art implementation shown in FIG. 4.

A primary drive (PD) signal derived from the primary control loops, is applied via an input (e.g. amplifier) 20, to the diametrically opposed PD transducers 41a, 41b, at 0° and 180°. The resultant ring motion is detected using the PPO transducer pair 42a, 42b, at 90° and 270°. This PPO signal is applied to an output (e.g. amplifier) 22 and is then demodulated and applied to a Phase Locked Loop (PLL) 45, which measures the phase difference between the PD signal applied at the input 20 and the PPO signal from the output 22.

The PLL output is then used to adjust a Voltage Control Oscillator (VCO) 46, which adjusts the drive frequency to maintain a 90° phase shift between the applied drive force and the induced resonant motion. The demodulated PPO signal is also applied to an Automatic Gain Control (AGC) loop 47 which compares the signal level to a fixed reference voltage $V_0$, and adjusts the PD signal amplitude to maintain a fixed signal level at the PPO output 22 and hence a fixed vibration amplitude.

In the embodiment shown in FIG. 6, the signal from the SPO transducers 43a, 43b, 43c, includes the signal from the additional secondary transducer 43c, and is applied to SPO output 23 before undergoing demodulation to separate the real and quadrature signal components.

After being demodulated at demodulators 48a, 48b, the SPO real and quadrature signals are filtered (blocks 400, 402) to achieve the required system performance in terms of noise and bandwidth. In a rate output circuit 440, the real component is filtered (block 404) and output (block 406) to provide an output representative of the applied angular rate. In a rate control loop 450, the filtered real and quadrature signal components from blocks 400, 402 are then re-modulated at modulators 481a, 481b, summed, and multiplied by a coefficient, β, dependent on the number of secondary drive transducers. A secondary drive signal of magnitude $\beta V_{SD}$ is then applied to SD input 21 to drive the secondary drive transducer 44b, to null the secondary mode motion of the angular rate sensing device 1.

Importantly, when compared to the prior art control circuitry shown in FIG. 4, the feedback electronics do not need to be changed significantly to implement the angular rate sensor 1 in this example of the present disclosure. Due to the fact that only a single secondary drive transducer 44b is provided, instead of two, the drive voltage required to deliver the required nulling force will be doubled thus altering the drive voltage by a factor corresponding to the coefficient β (where β=2), as indicated in FIG. 6. If required, the output scaling can be adjusted by multiplying by a coefficient 1/β prior to output at block 406.

Figure 7:
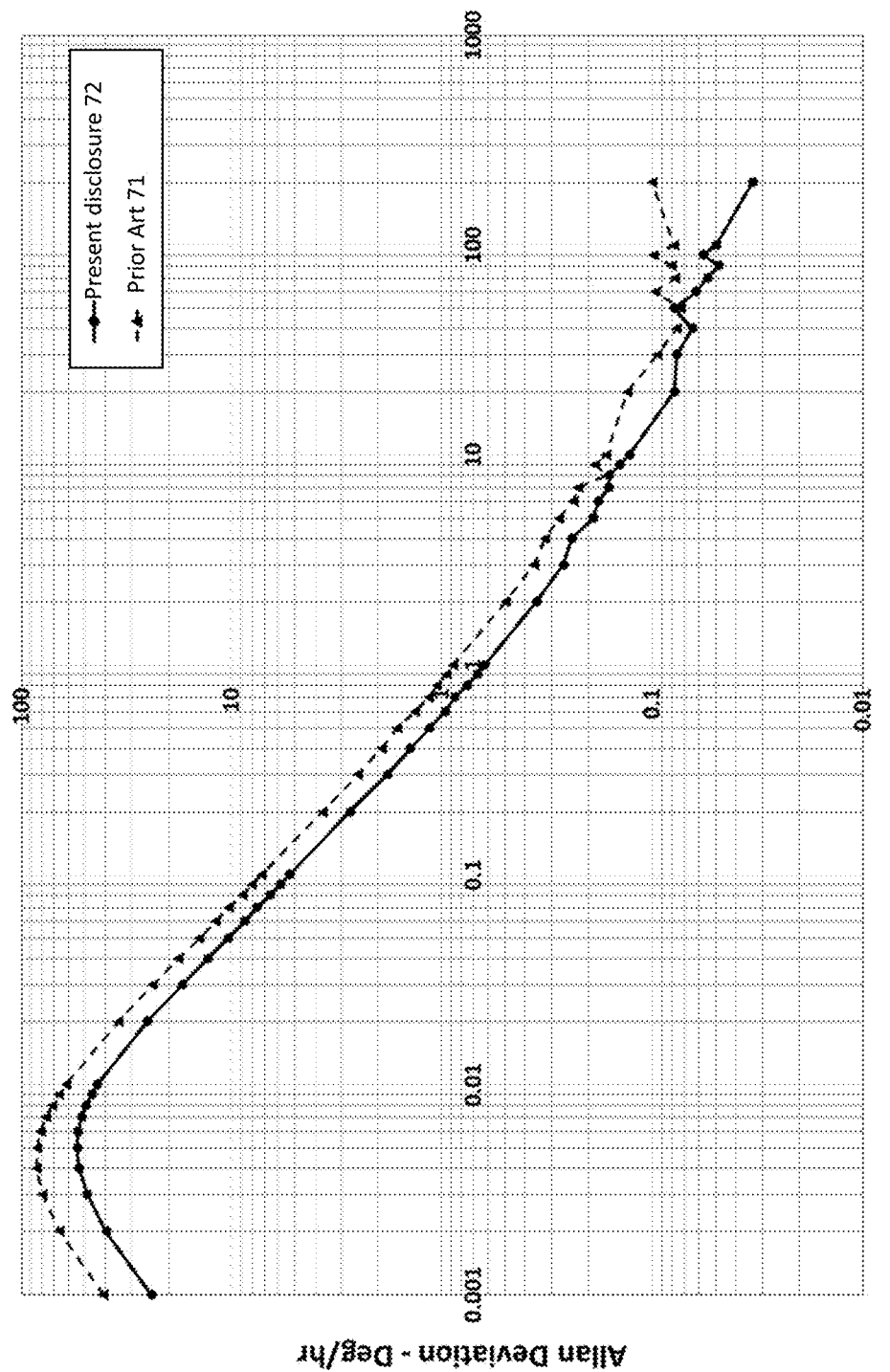
FIG. 7 is a graphical comparison of the relationship between Allan Deviation and averaging time as determined for a vibrating structure angular rate sensor as known in the prior art and a vibrating structure angular rate sensor according to the present disclosure.

The noise characteristics of the angular rate sensing device according to an example of the present disclosure and those of an angular rate sensing device known in the prior art are compared in FIG. 7. FIG. 7 shows an Allan Deviation comparison, which shows the output noise in degrees per hour of an angular rate sensor as a function of the averaging time for a time sequence of rate output data on a log-log scale. Curve 71 shows the Allan Deviation for a standard angular rate sensing device as known from the prior art, while curve 72 shows the results measured using an angular rate sensing device according to the present disclosure, i.e. including an additional secondary sensing tracking loop.

It can be seen in FIG. 7 that the noise level for the angular rate sensor of the present disclosure is reduced by a factor of ~2/3 over the majority of the averaging time range compared to that measured for the angular rate sensor known from the prior art. These improved noise characteristics provide a corresponding improvement in the North finding accuracy that can be achieved.

The concept of repurposing a secondary drive transducer as a secondary sensing or pick-off transducer may also be applied to capacitive-type vibrating structure angular rate sensors, such as described in U.S. Pat. No. 7,958,781. The transducers for this design consist of discrete capacitor plates with the ring forming a common capacitor plate. As with known inductive-type designs, the transducers for each drive and sensing function consist of pairs of diametrically opposed pairs. For this design, the drive and sensing plates are positioned on opposite sides of the ring circumference. This arrangement has performance advantages as described in U.S. Pat. No. 7,958,781.

Figure 8:
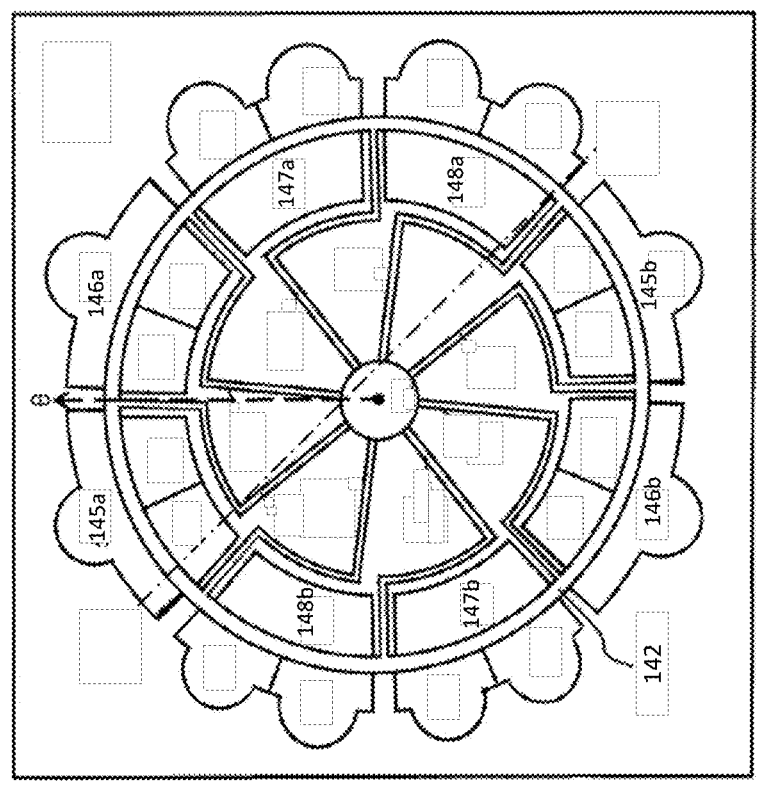
FIG. 8 illustrates a standard layout of a vibrating planar ring structure in a capacitive-type vibrating structure angular rate sensor.
Figure 9:
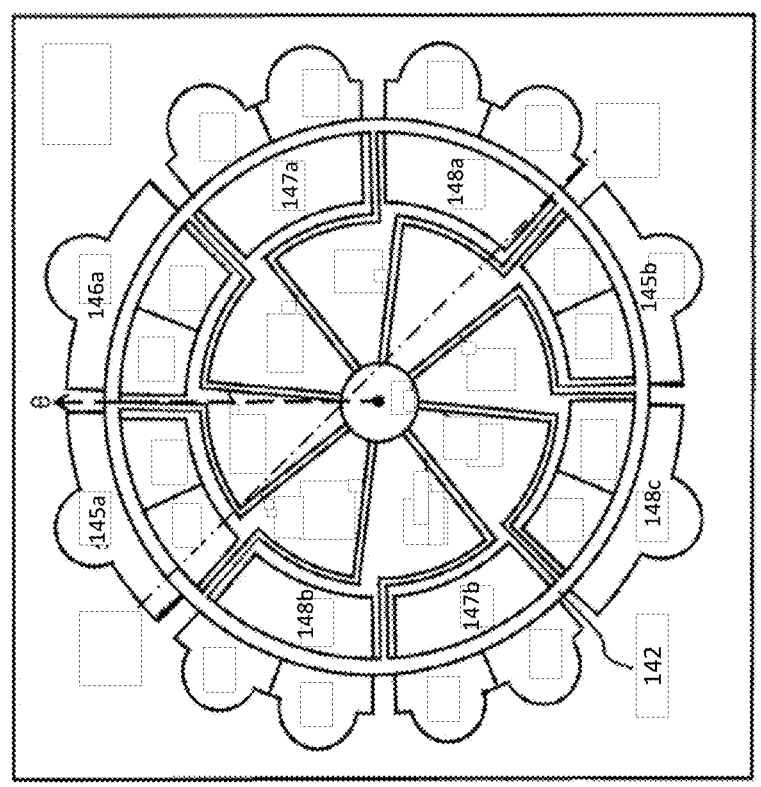
FIG. 9 illustrates a layout of a vibrating planar ring structure in a capacitive-type vibrating structure angular rate sensor according to another example of the present disclosure.

FIG. 8 (taken from U.S. Pat. No. 7,958,781) shows a schematic of the capacitive transducer arrangement around the inner and outer periphery of the ring 142. The primary drive transducers, 145a and 145b, and secondary drive transducers 146a and 146b are located externally to the ring with primary sensing transducers, 147a and 147b, and secondary sensing transducers, 148a and 148b, located internally. In another example of the present disclosure, such an arrangement may be modified as shown schematically in FIG. 9. The secondary drive nulling may be performed using only a single secondary drive transducer 146a with the other transducer of the pair being electrically connected to secondary sensing transducer pair 148a and 148b to form a third secondary sensing or pick-off transducer 148c, to increase the signal input to the SPO output by a factor of 1.5. The modified arrangement, shown in FIG. 9, provides the same noise reduction benefits as achieved for the inductive-type sensor described above and evidenced by FIG. 7.

It will be appreciated by those skilled in the art that the present disclosure has been illustrated by describing one or more specific examples thereof, but is not limited to these examples; many variations and modifications are possible, within the scope of the accompanying claims.

The invention claimed is:

1. A vibrating structure angular rate sensor comprising:
a MEMS structure comprising a mount, a plurality of supporting structures fixed to the mount, and a vibrating planar ring structure flexibly supported by the plurality of supporting structures to move elastically relative to the mount;
at least one primary drive transducer arranged to cause the ring structure to oscillate in a primary mode at the resonant frequency of the primary mode;
at least one primary pick-off transducer arranged to detect oscillation of the ring structure in the primary mode;
at least three secondary pick-off transducers arranged to detect oscillation of the ring structure in a secondary mode induced by Coriolis force when an angular rate is applied around an axis substantially perpendicular to the ring structure; and
at least one secondary drive transducer arranged to null the induced oscillation in the secondary mode; and
wherein the number of secondary pick-off transducers and the number of secondary drive transducers is an odd number, and wherein the number of secondary drive transducers is smaller than the number of secondary pick-off transducers.

2. The sensor of claim 1, wherein the at least three secondary pick-off transducers are electrically connected in series.

3. The sensor of claim 1, further comprising a secondary pick-off signal output arranged to receive a secondary pick-off signal from each of the at least three secondary pick-off transducers.

4. The sensor of claim 3, wherein the secondary pick-off signal output comprises an analogue amplifier.

5. The sensor of claim 4, further comprising a rate output circuit connected to the secondary pick-off signal output to provide an output representative of the applied angular rate.

6. The sensor of claim 3, further comprising a rate control loop connected to the secondary pick-off signal output.

7. The sensor of claim 6, wherein the rate control loop is arranged to apply a secondary drive signal to the at least one secondary drive transducer, the secondary drive signal having a magnitude including a coefficient dependent on the number of secondary drive transducers.

8. The sensor of claim 7, wherein the coefficient is two when there are three secondary pick-off transducers.

9. The sensor of claim 1, wherein the transducers consist of a pair of primary drive transducers, a pair of primary pick-off transducers, one secondary drive transducer and three secondary pick-off transducers.

10. The sensor of claim 1, wherein the transducers are spaced equi-angularly around a circumference of the vibrating planar ring structure.

11. The sensor of claim 1, wherein each transducer is an inductive-type transducer.

12. The sensor of claim 1, wherein each transducer is a capacitive-type transducer.

13. The sensor of claim 1, wherein the MEMS structure is a semiconductor structure.

14. The sensor of claim 1, further comprising a sensor package, the MEMS structure being sealed inside the sensor package, and a printed circuit board on which the sensor package in mounted, wherein electrical connections are made from the printed circuit board to the MEMS structure through the sensor package.

* * * * *